United States Patent
Gibb et al.

(10) Patent No.: US 11,687,365 B2
(45) Date of Patent: Jun. 27, 2023

(54) METHOD AND APPARATUS FOR CONTROLLING A COMPUTATIONAL STORAGE PROCESSOR

(71) Applicant: EIDETIC COMMUNICATIONS INC., Calgary (CA)

(72) Inventors: Sean Gregory Gibb, Calgary (CA); Saeed Fouladi Fard, Calgary (CA)

(73) Assignee: EIDETIC COMMUNICATIONS INC., Calgary (CA)

( * ) Notice: Subject to any disclaimer, the term of this patent is extended or adjusted under 35 U.S.C. 154(b) by 147 days.

(21) Appl. No.: 17/128,516

(22) Filed: Dec. 21, 2020

(65) Prior Publication Data

US 2022/0197704 A1 Jun. 23, 2022

(51) Int. Cl.
- *G06F 9/48* (2006.01)
- *G06F 3/06* (2006.01)
- *G06F 9/50* (2006.01)

(52) U.S. Cl.
CPC .......... *G06F 9/4881* (2013.01); *G06F 3/06* (2013.01); *G06F 3/0601* (2013.01);
(Continued)

(58) Field of Classification Search
CPC . G06F 9/48; G06F 9/4881; G06F 9/50; G06F 9/5027; G06F 9/5072;
(Continued)

(56) References Cited

U.S. PATENT DOCUMENTS 9,141,670 B2 9/2015 Branscome et al.
2017/0286363 A1* 10/2017 Joshua ............... H04L 63/0428
(Continued)

FOREIGN PATENT DOCUMENTS

WO 2017176775 A1 10/2017

OTHER PUBLICATIONS

Peng et al, "MDev-NVMe: A NVMe Storage Virtualization Solution with Mediated Pass-Through", Proceedings of the 2018 USENIX Annual Technical Conference (USENIX ATC '18). Jul. 11-13, 2018 • Boston, MA, USA, pp. 665-676 (Year: 2018).*
(Continued)

*Primary Examiner* — Charles M Swift
(74) *Attorney, Agent, or Firm* — Borden Ladner Gervais LLP; Todd Keeler

(57) ABSTRACT

A computational storage processor (CSP) is provided that includes the CSP comprising a plurality of submission queues (SQs), a plurality of computational storage functions (CSFs), a CSF controller, and a CSP controller, and a method of controlling the CSP is provided that includes directing a first submission queue entry (SQE) that is written to a first one of the plurality of SQs to the CSF controller, generating, by the CSF controller, one or more secondary SQEs based on the first SQE, each of the one or more secondary SQEs is directed to a respective one of the CSFs, writing, by the CSF controller, the one or more secondary SQEs to a second one of the plurality of SQs, directing each of the one or more secondary SQEs to an associated respective one of the CSFs, and for each of the one or more secondary SQEs, performing, by the associated respective one of the CSFs, an operation associated with the secondary SQE.

20 Claims, 7 Drawing Sheets

(52) U.S. Cl.
CPC .......... *G06F 3/0646* (2013.01); *G06F 3/0653* (2013.01); *G06F 3/0655* (2013.01); *G06F 3/0658* (2013.01); *G06F 3/0659* (2013.01); *G06F 3/0661* (2013.01); *G06F 9/48* (2013.01); *G06F 9/4806* (2013.01); *G06F 9/4843* (2013.01); *G06F 9/50* (2013.01); *G06F 9/5005* (2013.01); *G06F 9/5011* (2013.01); *G06F 9/5016* (2013.01); *G06F 9/5027* (2013.01); *G06F 9/5072* (2013.01); *G06F 9/5088* (2013.01)

(58) Field of Classification Search
CPC .... G06F 9/5088; G06F 9/4806; G06F 9/4843; G06F 9/5005; G06F 9/5011; G06F 9/5016; G06F 3/06; G06F 3/0601; G06F 3/0646; G06F 3/0653; G06F 3/0655; G06F 3/0658; G06F 3/0659; G06F 3/0661
See application file for complete search history.

(56) References Cited

U.S. PATENT DOCUMENTS

| | | | |
|---|---|---|---|
| 2018/0095911 A1* | 4/2018 | Ballapuram | G06F 13/1668 |
| 2019/0042148 A1* | 2/2019 | Benisty | G06F 13/1673 |
| 2019/0278739 A1 | 9/2019 | Tamir et al. | |
| 2020/0151137 A1* | 5/2020 | Izenberg | G06F 16/90335 |

OTHER PUBLICATIONS

Cameron et al., "Optorism: a Simulation Tool for Scheduling and Replica Optimisation in Data Grids," Computing in High Energy Physics and Nuclear Physics, Dec. 2004, pp. 707-710.

International Patent Application No. PCT/CA2021/051828, International Search Report and Written Opinion dated Feb. 18, 2022.

Vincon et al., "nKV: Near -data Processing With KV -stores on Native Computational Storage," DaMoN '20 Proceedings of the 16th International Workshop on Data Management on New Hardware, Jun. 2020, pp. 1-11.

* cited by examiner

METHOD AND APPARATUS FOR CONTROLLING A COMPUTATIONAL STORAGE PROCESSOR

FIELD

The present disclosure relates to controlling a computational storage processor.

BACKGROUND

Computational Storage Processors (CSP) offer a mechanism to offload from process-intensive computational storage operations from central processing units (CPUs) to free up processing resources of the CPUs for performing other tasks. Operations performed by CSPs include, for example, compression, encryption, erasure coding, and machine learning. Different operations may be performed by different hardware accelerator devices of a CSP that are configured to perform particular operations. The hardware accelerators of a CSP may be referred to as computational storage functions (CSFs).

To build complex CSP systems it may be desirable to chain together multiple CSFs, potentially across multiple devices, and may require user defined functionality.

Performing operations by CSFs in such complex systems, particularly when multiple operations are to be sequentially performed on data by multiple CSFs, may result in increased internal bandwidth on the CSP to perform the multiple separate operations. For example, input to and the output from the first CSF are written to memory, the output being read by a second CSF, with the output from that second CSF being written to memory, and so on, requiring significant internal bandwidth. In conventional CSPs, the bandwidth required by such memory reads and writes degrade CSP performance, or is addressed by utilizing high bandwidth memory, which is expensive and therefore significantly increases the overall cost of the CSP.

Further, in conventional CSPs in which a host orchestrates data transfers between CSFs, the relatively high latency between the host and the CSP, especially when the host and the CSP are communicating over one or more networks, may have a detrimental effect on the CSP performance.

Improvements in CSPs are desired.

BRIEF DESCRIPTION OF THE DRAWINGS

Embodiments of the present disclosure will now be described, by way of example only, with reference to the attached Figures.

DETAILED DESCRIPTION

Figure 1:
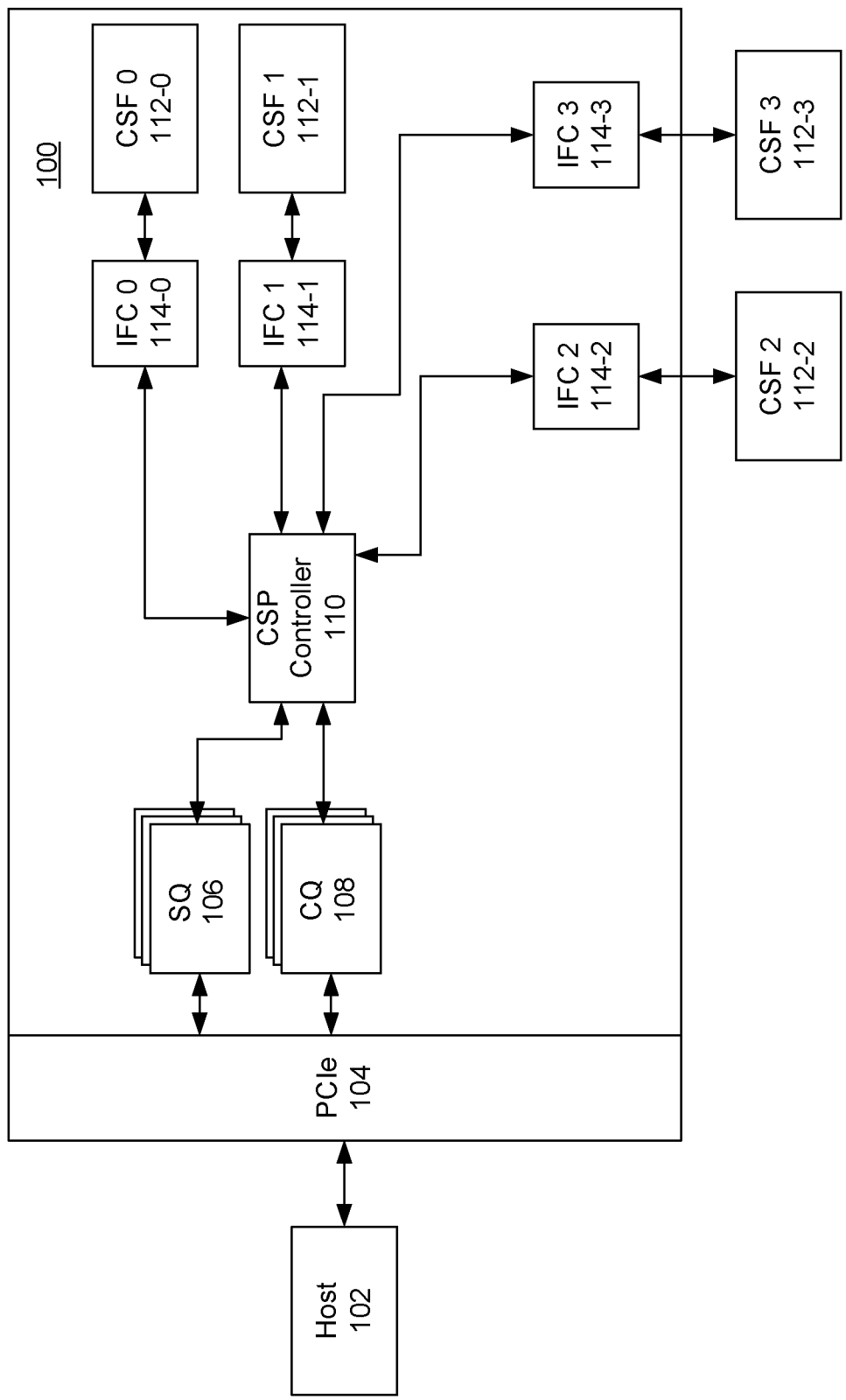
FIG. 1 illustrates a computational storage processor according to the prior art.

Embodiments of the present disclosure relate to a computational storage processor (CSP) having multiple computational storage functions (CSF), and a CSF controller for controlling the operations performed by the CSFs. In an embodiment, the CSF controller provides composability, which as used herein means the capability of dynamically chaining together one or more functions performed by the other CSFs so that, for example, the user of the system can cause functions to be performed by more than one CSF utilizing a single command to the CSP. In another embodiment, the CSF controller may function as a bridge between a first CSP which includes the CSF controller and a second CSP having its own CSF controller such that CSFs on the second CSP may be accessed by a host of the first CSP. In this embodiment, the host need not know which CSP the CSF for performing the desired function is located on. The host merely provides the command to the CSF controller of the first CSP, and that CSF controller passes the command to the CSF controller of the second CSP such that the function is performed by one or more of the CSFs of the second CSP.

In an embodiment, the present disclosure provides a method of controlling a computational storage processor (CSP) connected to a host, the CSP comprising a plurality of submission queues (SQs), a plurality of computational storage functions (CSFs), a CSF controller, and a CSP controller, that includes directing a first submission queue entry (SQE) that is written to a first one of the plurality of SQs to the CSF controller, generating, by the CSF controller, one or more secondary SQEs based on the first SQE, each of the one or more secondary SQEs is directed to a respective one of the CSFs, writing, by the CSF controller, the one or more secondary SQEs to a second one of the plurality of SQs, directing each of the one or more secondary SQEs to an associated respective one of the CSFs, for each of the one or more secondary SQEs, performing, by the associated respective one of the CSFs, an operation associated with the secondary SQE. In an example embodiment, the first one of the plurality of SQs is a SQ that is accessed by the host connected to the CSP, and the second one of the plurality of SQ is a SQ that is not accessed by the host of the CSP.

In an example embodiment, the CSP includes a plurality of completion queues (CQs), and the method further includes for each of the one or more secondary SQEs in response to receiving an indication from the associated respective one of the CSFs that the operation associated with the secondary SQE has been completed, writing to a second one of the plurality of CQ a secondary completion queue entry (CQE) associated with the secondary SQE to, the secondary CQE being directed to the CSF controller, reading, by the CSF controller from the second one of the plurality of CQ, the secondary CQE, determining, by the CSF controller, that all operations associated with the plurality of secondary SQEs have been performed when a secondary CQE associated with each of the one or more secondary SQEs is written into the second one of the plurality of CQ, and in response to determining, by the CSF controller, that all operations associated with the one or more secondary SQE have been performed, writing to a first one of the plurality of CQ a primary CQE directed to the host.

In an example embodiment, the first one of the plurality of CQ is a CQ that is accessed by the host connected to the CSP, and the second one of the plurality of CQ is a CQ that is not accessed by the host of the CSP.

In an example embodiment, the one or more secondary SQEs generated by the CSF controller comprise a first secondary SQE associated with a first operation and a second secondary SQE associated with a second operation to be performed sequentially after the first operation is performed, and writing, by the CSF controller, the one or more secondary SQEs to a second one of the plurality of SQs comprises writing the second secondary SQE to the second one of the plurality of SQs only after a first secondary CQE associated with the first SQE is read by the CSF controller.

In an example embodiment, the CSP includes an embedded processor and a memory, and wherein a first one of the plurality of CSFs is configured to perform decryption, and the first SQE comprises a command to program compiled code onto the embedded processor, the method further includes the CSF controller reading encrypted compiled code from a host accessible memory located off the CSP and writing the encrypted compiled code into the memory of the CSP in response to the first SQE being directed to the CSF controller, and generating, by the CSF controller, the one or more of secondary SQEs based on the first SQE comprises generating a first secondary SQE directed to the first one of the CSFs to cause the first one of the CSFs to decrypt the encrypted compiled code in the memory using the decryption key to generate decrypted compiled code, a second secondary SQE directed to the first one of the CSFs to cause the first one of the CSFs to write the decrypted compiled code to the memory, and a third secondary SQE directed to the embedded processor to cause the embedded processor to execute the decrypted compiled code from the memory, writing, by the CSF controller, the plurality of second SQEs to the second one of the plurality of SQs comprising writing the first, second, and third secondary SQEs to the second one of the plurality of SQs, and directing the first secondary SQE to the first one of the CSFs includes providing a decryption key to the first one of the secondary CSF configured to perform decryption.

In an example embodiment, writing, by the CSF controller, the second secondary SQE to the second one of the plurality of SQs is performed after the decrypted compiled code is generated by the first one of the CSFs, and writing, by the CSF controller, the third secondary SQE to the second one of the plurality of SQs is performed after the decrypted compiled code is written to the memory.

In an example embodiment, the method further includes determining by the first one of plurality of CSFs whether the decryption operation was successful, and writing the third secondary SQE is performed by the CSF controller only if the decryption operation was determined to be successfully performed.

In another embodiment, the present disclosure provides a method of controlling a computational storage system, the computational storage system including a first computational storage processor (CSP) connected to a first host and a second CSP that is remote to the first CSP, the first CSP comprising a plurality of first submission queues (SQs), a plurality of first computational storage functions (CSFs), a first CSF controller, and a first CSP controller, and the second CSP comprising a plurality of second SQs, a plurality of second CSFs, a second CSF controller and a second CSP controller, wherein the first CSF controller is connected to the second CSF controller via a network, the method includes directing a first submission queue entry (SQE) written by the first host to one of the plurality of first SQs to the first CSF controller, directing, by the first CSF controller, the first SQE to the second CSF controller included on the second CSP, generating, by the second CSF controller, one or more secondary SQEs based on the first SQE, each of the one or more secondary SQEs is directed to a respective one of the plurality of second CSFs, writing, by the second CSF controller, the one or more secondary SQEs to one of the plurality of second SQs, directing each of the one or more secondary SQEs to an associated respective one of the plurality of second CSFs, for each of the one or more secondary SQEs, performing, by the associated respective one of the plurality of second CSFs, an operation associated the secondary SQE.

In an example embodiment, the first CSP includes a plurality of first completion queues (CQs) and the second CSP includes a plurality of second CQs, and the method further includes for each of the one or more secondary SQEs in response to receiving an indication from the associated respective one of the plurality of second CSFs that the operation associated with the secondary SQE has been completed, writing, to one of the plurality of second CQs, a secondary completion queue entry (CQE) associated with the secondary SQE, the secondary CQE being directed to the second CSF controller, reading, by the second CSF controller from the one of the plurality of second CQs, the secondary CQE, determining, by the second CSF controller, that all operations associated with the plurality of secondary SQEs have been performed when a secondary CQE associated with each of the one or more secondary SQEs is written into the plurality of second CQs, in response to determining, by the second CSF controller, that all operations associated with the one or more secondary SQE have been performed, sending, by the second CSF controller, an indication to the first CSF controller that all operations associated with the first SQE have been performed, and in response to receiving the indication from the second CSF controller, writing to one of the plurality of first CQs a primary CQE associated with the first SQE, the primary CQE directed to the first host.

In an embodiment, the present disclosure provides a computational storage processor (CSP) connected to a host, the CSP includes a plurality of submission queues (SQs), a plurality of computational storage functions (CSFs), a CSF controller, and a CSP controller, the CSP controller is configured to direct a first submission queue entry (SQE) that is written to a first one of the plurality of SQs to the CSF controller, the CSF controller is configured to generate one or more secondary SQEs based on the first SQE, each of the one or more secondary SQEs is directed a respective one of the CSFs, and write the one or more secondary SQEs to a second one of the plurality of SQs, and the CSP controller is further configured to direct each of the one or more secondary SQEs to an associated respective one of the CSFs such that, for each of the one or more secondary SQEs, the associated respective one of the CSFs performs an operation associated the secondary SQE.

In an example embodiment, the first one of the plurality of SQs is a SQ that is accessed by the host connected to the CSP, and the second one of the plurality of SQ is a SQ that is not accessed by the host of the CSP.

In an example embodiment, the CSP further includes a plurality of completion queues (CQs), the CSP controller is further configured to, for each of the one or more secondary SQEs in response to receiving an indication from the associated respective one of the CSFs that the operation associated with the secondary SQE has been completed, write to a second one of the plurality of CQ a secondary completion queue entry (CQE) associated with the secondary SQE to, the secondary CQE being directed to the CSF controller, the CSF controller is configured to read from the second one of the plurality of CQ, each of the one or more secondary CQEs, and determine that all operations associated with the plurality of secondary SQEs have been performed when a secondary CQE associated with each of the one or more secondary SQEs is written into the second one of the plurality of CQ, and the CSP controller if further configured to, in response to determining that all operations associated with the one or more secondary SQE have been performed, writing to a first one of the plurality of CQ a primary CQE directed to the host.

In an example embodiment, the first one of the plurality of CQs is a CQ that is accessed by the host connected to the CSP, and the second one of the plurality of CQs is a CQ that is not accessed by the host of the CSP.

In an example embodiment, the CSF controller being configured to generate one or more secondary SQEs comprises the CSF controller being configured to generate a first secondary SQE associated with a first operation and a second secondary SQE associated with a second operation to be performed sequentially after the first operation is performed; and the CSF controller being configured to write the one or more secondary SQEs to a second one of the plurality of SQs comprises the CSF controller being configured to write the second secondary SQE to the second one of the plurality of SQs only after a first secondary CQE associated with the first SQE is read by the CSF controller.

In an example embodiment, the CSP further includes an embedded processor and a memory, a first one of the plurality of CSFs configured to perform decryption and the first SQE comprises a command to program compiled code onto the embedded processor, the CSF controller is further configured to read encrypted compiled code from a host accessible memory located off the CSP and writing the encrypted compiled code into the memory of the CSP in response to the first SQE being directed to the CSF controller, the CSF controller being configured to generate the one or more of secondary SQEs based on the first SQE comprises the CSF controller being configured to generate a first secondary SQE directed to the first one of the CSFs to cause the first one of the CSFs to decrypt the encrypted compiled code in the memory using the decryption key to generate decrypted compiled code, a second secondary SQE directed to the first one of the CSFs to cause the first one of the CSFs to write the decrypted compiled code to the memory, and a third secondary SQE directed to the embedded processor to cause the embedded processor to execute the decrypted compiled code from the memory, the CSF controller being configured to write the plurality of second SQEs to the second one of the plurality of SQs comprises the CSF controller being configured to write the first, second, and third secondary SQEs to the second one of the plurality of SQs, and wherein the CSP controller being configured to direct the first secondary SQE to the first one of the CSFs comprises the CSP controller providing a decryption key to the first one of the secondary CSF configured to perform decryption.

In an example embodiment, the CSF controller is configured to write the second secondary SQE to the second one of the plurality of SQs after the decrypted compiled code is generated by the first one of the CSFs, and the CSF controller is configured to write the third secondary SQE to the second one of the plurality of SQs after the decrypted compiled code is written to the memory.

In an example embodiment, the first one of plurality of CSFs is configured to determine whether the decryption operation was successful, and the CSF controller is configured to write the third secondary SQE only if the decryption operation was determined to be successfully performed.

In an embodiment, the present disclosure provides a computational storage system that includes a first computational storage processor (CSP) connected to a first host, the first CSP including a plurality of first submission queues (SQs), a plurality of first computational storage functions (CSFs), a first CSF controller, and a first CSP controller, and a second CSP that is remote to the first CSP, the second CSP including a plurality of second SQs, a plurality of second CSFs, a second CSF controller, and a second CSP controller, the first CSF controller is connected to the second CSF controller via a network, the first CSP controller is configured to direct a first submission queue entry (SQE) written by the first host to one of the plurality of first SQs to the first CSF controller, the first CSF controller is configured to direct the first SQE to the second CSF controller included on the second CSP, the second CSF controller is configured to generate one or more secondary SQEs based on the first SQE, each of the one or more secondary SQEs is directed to a respective one of the plurality of second CSFs, and write the one or more secondary SQEs to one of the plurality of second SQs, the second CSP controller is configured to direct each of the one or more secondary SQEs to an associated respective one of the plurality of second CSFs such that, for each of the one or more secondary SQEs, the associated respective one of the plurality of second CSFs perform an operation associated the secondary SQE.

In an example embodiment, the first CSP further includes a plurality of first completion queues (CQs) and the second CSP further includes a plurality of second CQs, the second CSP controller is configured to, for each of the one or more secondary SQEs in response to receiving an indication from the associated respective one of the plurality of second CSFs that the operation associated with the secondary SQE has been completed, write, to one of the plurality of second CQs, a secondary completion queue entry (CQE) associated with the secondary SQE, the secondary CQE being directed to the second CSF controller; the second CSF controller is configured to read from the one of the plurality of second CQs, the secondary CQE, determine that all operations associated with the plurality of secondary SQEs have been performed when a secondary CQE associated with each of the one or more secondary SQEs is written into the plurality of second CQs, and in response to determining, by the second CSF controller, that all operations associated with the one or more secondary SQE have been performed, send an indication to the first CSF controller that all operations associated with the first SQE have been performed, and the first CSP controller is configured to, in response to the first CSF controller receiving the indication from the second CSF controller, write a primary CQE associated with the first SQE to one of the plurality of first CQs, the primary CQE directed to the first host.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described.

The illustrative examples set forth in the present disclosure are described as utilizing commands utilizing the Non-Volatile Memory Express (NMVe) and being passed through peripheral component interconnect express (PCIe) interfaces, particularly in the use of submission and completion queues for communication between a host and a CSP. However, the examples and embodiments of the present disclosure may be extended to use any suitable interface specifications.

FIG. 1 is a schematic diagram of an example of a CSP 100. The CSP 100 is connected to a host 102. The host 102 issues commands to the CSP 100 via a PCIe interface 104. In the example shown, the interface 104 utilizes the PCIe standard.

The CSP 100 includes a plurality of submission queues (SQs) 106, a plurality of completion queues (CQs) 108, a CSP controller 110, and a plurality of CSFs 112-0 to 112-3, each of the CSFs 112-0 to 112-3 having an associated interface (IFC) 114-0 to 114-3.

Each of the CSFs 112-0 to 112-3 may be a software or hardware accelerator device that is comprised of, for example, an accelerator core on the same field-programmable gate array (FPGA) or application-specific integrated circuit (ASIC) or computer processing unit (CPU) or an accelerator core on a different FPGA, ASIC, or CPU. In one example, one or more of the CSFs 112-0 to 112-3 may be a custom circuit implemented on, for example, a FPGA. In another example, one or more of the CSFs 112-0 to 112-3 may be a soft programmable acceleration function implemented on a native instruction processor such as an advanced RISC (reduced instruction set computing) machine (ARM) embedded processor or a bytecode interpreted processor such as, for example, an eBPF processor.

One or more of the CSF 112-0 to 112-3 may be specifically configured to perform a particular operation. For example, some of the CSFs 112-0 to 112-3 may be specifically configured to perform, for example, compression, encryption, erasure coding, machine learning, storage, or any other desired algorithm. In other examples, some of the CSFs 112-0 to 112-3 may be not be configured to perform a specific operation, and may be programmable to perform particular operations as needed.

In some examples, one or more of the CSFs may be physically separated from other elements of the CSP 100 such as, for example, providing these CSFs off chip from the CSP 100. In the example shown in FIG. 1, CSF 2 112-2 and CSF 3 112-3 are provided off-chip, i.e., separate from the CSP 100, whereas the associated interfaces, IFC 2 114-2 and IFC 4 114-3 are included on-chip, i.e., include on the CSP 100. Off-chip CSFs 112-2 and 112-3 may be included in a CSP 100 if, for example, one physical device is not large enough to include CSFs to perform all desired operations. The off chip CSFs may be included to perform data storage functions which may include, for example, Computational Storage Drives (CSDs). The off chip CSFs of a CSP may be connected to the associated interface by any suitable means, and the connection may be wired or wireless, and may be over a network such as a local area network (LAN) or wide area network (WAN).

The SQs 104 store commands related to functions to be performed by one or more of the CSFs 112-0 to 112-3. The commands may be referred to as submission queue entries (SQEs). Typically, the SQEs are written by the host 102 to one of the SQs 104 via the PCIe interface 104. The SQE may include commands, data, pointers to input and output data locations, and other control data.

The CQs 108 store completion queue entries (CQEs) that may be written by, for example, the CSP controller 110 into one of the CQs 106 after a function being performed by a CSF 112-0 to 112-3 is completed. Typically, the CQEs include status codes. In some examples, for example in CSPs that do not utilize the NVMe standard, the CQEs may also include other information, such as, for example, data or pointers to data.

The CSP controller 110 and the host 102 communicate with each other via the SQs 106 and the CQs 108. The CSP controller 110 performs input/output functions, including passing commands written by the host 102 to the appropriate IFCs 114-0 to 114-3 such that a desired function is performed by the associated CSF 112-0 to 112-3. The CSP controller 110 may also perform administrative functions of the CSP 100 including, for example, formatting devices, reading supported features, flushing processing, and interrogating devices.

The IFCs 114-0 to 114-3 receive commands from the CSP controller 100, coordinate appropriate data transfers, and communicate with the CSP controller 100 when the function is complete, while the associate CSF 112-0 to 112-3 performs the actual function.

Although the IFCs 114-0 to 114-3 are shown as separate components from the associated CSFs 112-0 to 112-3, one or more of the pairs of IFCs 114-0 to 114-3 and associated CSFs 112-0 to 112-3 may be included within a single component. For simplicity, reference to a CSF in the present description and the appended claims may refer to both the interface and the CSF such that functions described as being performed by a particular CSF may be, or include, a function that is actually performed by the associated interface associated with the CSF. However, in practice, tasks such as, for example, input/output data transfer and coordination are performed by the IFC, whereas acceleration tasks such as compression, encryption, and AI data processing are performed by the CSF.

In operation, the host 102 initiates a data transaction to be performed by the CSP 100 by writing an SQE into the SQs 106. The SQE may be addressed to a particular one of the CSFs 112-1 to 112-3 by including a namespace identifier of the particular one of the CSFs 112-1 to 112-3.

The SQE is read by the CSP controller 110 and sent to the appropriate IFC 114-0 to 114-3 of the addressed CSF 112-0 to 112-3. The IFC 114-0 to 114-3 coordinates any necessary data transfers, such as for example, reading data that the desired operation is to be performed on from a specified location, such as memory (not shown) associated with the host 102, initiates the performance of the operation by the associated CSF 112-0 to 112-3, then coordinates writing of any data generated by the operation as necessary such as writing into a memory (not shown) provided on the CSP 100 or a remote memory (not shown) connected to the CSP 100.

Once the operation is complete, the IFC 112-0 signals the CSP Controller 110 that the operation has been completed, or has failed as the case may be, and the CSP controller 110 writes a CQE directed to the host 102 into the CQs 108 indicating the completion, or failure, of the desired operation.

The host 102 then reads the CQE to determine whether the operation is complete or has failed. Once the host 102 confirms the operation was successfully completed, the host 102 may utilize the generated data.

In some instances, particularly when multiple sequential operations on data is required, inefficiencies in conventional CSPs, such as CSP 100, may result. In an example, a system may need to compress data and then encrypt it before sending it over a network connection in order to decrease the amount of traffic on the network and improve the security of the data being transmitted.

In the conventional operation of a CSP, such as CSP 100, performing compression and encryption operations requires two independent operations on the data, such that the host 102 initiates the first operation by writing an SQE to the SQ 106, which causes the data to be, for example, compressed, and a CQE being written to the CQ 108. Once the host 102 reads the CQE to verify that the compression operation is complete, the host 102 then writes a second SQE to the SQ 106, which causes the compressed data to be encrypted.

During these operations the data is passed to the CSP 100 to be compressed, compressed data passed back to the host 102, then passed back to the CSP 100 to be encrypted, then passed back to the host 102. This effectively doubles the number of data transfers between the host 102 and the CSP 100 in order to both compress and encrypt the data compared to performing a single operation.

Alternatively, the conventional way to reduce the number of data transfers between the host 102 and CSP 100 is to utilize internal memory such that data input data passed to the CSP 100 is written to the internal memory to be compressed, then the input data is read from the memory to be compressed, the compressed data written back to the internal memory, then the compressed data is read from the memory to be encrypted, then encrypted memory is written back to the memory, then the encrypted data is read from the memory to be passed back to the host 102. These multiple reads and writes requires significant amounts of internal bandwidth compared to performing a single operation.

A further complication occurs if CSFs utilized by the CSP 100 are spread across multiple acceleration devices with a nonstandard or internal framework including multiple FPGAs, for example, on a E1.L EDSFF form factor or multiple devices connected directly with cabling. This results in a high latency communication channel. High latency control access to the accelerators is detrimental to accelerator performance and should be avoided. For example, although very flexible, a CPU reaching across a high latency cable channel cannot effectively coordinate high speed operations between accelerators or media without sacrificing performance.

Figure 2:
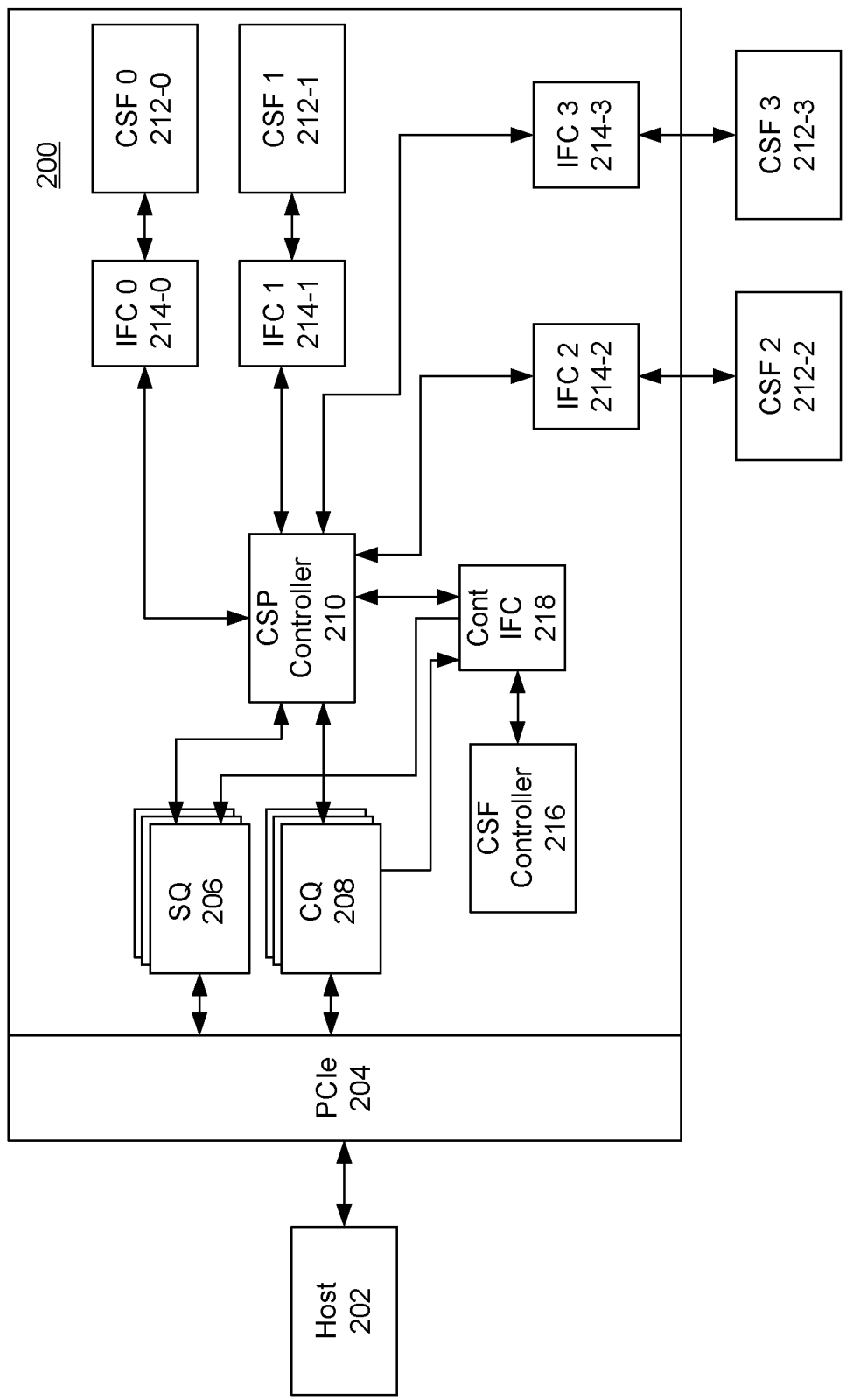
FIG. 2 illustrates a computational storage processor according to an embodiment of the present disclosure.

Referring now to FIG. 2, an example CSP 200 that overcomes at least some of the above described inefficiencies with conventional CSPs, such as the example CSP 100, is shown.

The example CSP 200 shown in FIG. 2 includes a PCIe interface 204, a plurality of SQs 206, a plurality of CQs 208, a CSP controller 210, CSFs 212-0 to 212-3 and associated IFCs 214-0 to 214-3, which may be substantially similar to the PCIe interface 104, SQs 106, CQs 108, a CSP controller 110, CSFs 112-0 to 112-3 and associated IFCs 114-0 to 114-3, and therefore are not further describe here for simplicity.

The operation of CSP 200 differs from the conventional operation of CSPs, such as the operation of the example CSP 100 described previously, in that the CSP 200 additionally includes a CSF controller 216 having an associated controller IFC 218. The CSF controller 216 and associated controller IFC 218 may be substantially similar to a CSF and its interface, such as the CSFs 212-0 to 212-3 and the IFC 214-0 to 214-3, but are configured to control the operations performed by the CSFs 212-0 to 212-3 in order to offload functionality from the host 202. For example, the CSF controller 216 is configured to access the SQs 206 and CQs 208 such that the CSF controller 216 may write SQEs to the SQ 206 to schedule commands for the CSFs 212-0 to 212-3 to perform operations, and retrieving the results from the operations performed in response to those SQEs.

A host 202 connected to the CSP 200 initiates data operations performed by the CSP 200 by writing commands to the SQ 206 via the PCIe interface 204. However, rather than these SQEs being directed to a specific CSF 212-0 to 212-3, the host 202 writes SQEs directed to the CSF controller 216, and the operations to be performed by the CSFs 212-0 to 212-3 in response to the SQE written by the host 202 are coordinated by the CSF controller 216 by writing one or more secondary SQEs to the SQs 206, the secondary SQEs being directed to appropriate CSFs 212-0 to 212-3.

Including a CSF controller 216 in a CSP 200 provides a solution to several important issues that may be present in conventional CSPs, and specifically for CSPs that utilize NVMe. In particular, unlike conventional CSPs, the host 202 connected to CSP 200 need not know the namespace identifiers of the CSFs 212-0 to 212-3 that is configured to perform a desired operation. Rather, the host 202 need only know the namespace identifier of the CSF controller 216, and the namespace controller 216 directs the appropriate CSF 212-0 to 212-3 to perform the desired operation by writing a secondary SQE directed to that CSF 212-0 to 212-3. Further, as discussed in more detail with reference to FIG. 4, a CSF controller may be configured to facilitate programmable and secure cooperation of multiple CSPs distributed across a network such that CSFs included on separate CSPs may be utilized to perform a desired operation in a manner that is transparent to the host that initiates the operation.

Additionally, multiple storage functions may be performed by multiple CSFs 212-0 to 212-3 in response to the host 202 issuing a single command, with the CSF controller 216 coordinating the multiple operations and data transfers between the CSFs 212-0 to 212-3 between subsequent operations, which reduces external communication with the host 202 which may reduce external communication, or internal bandwidth, or both that are utilized in performing multiple operations. In one example, the CSF controller 206 may be configured to facilitate encrypted firmware being executed by any processor cores, such as processing cores in any of the CSF 212-0 to 212-3 in the CSP, by coordinating the decryption of the firmware and the processing core executing the decrypted firmware in response to successful decryption all by a single SQE written by the host 202, and a single transfer between the host 202 and the CSP 200.

Figure 3A:
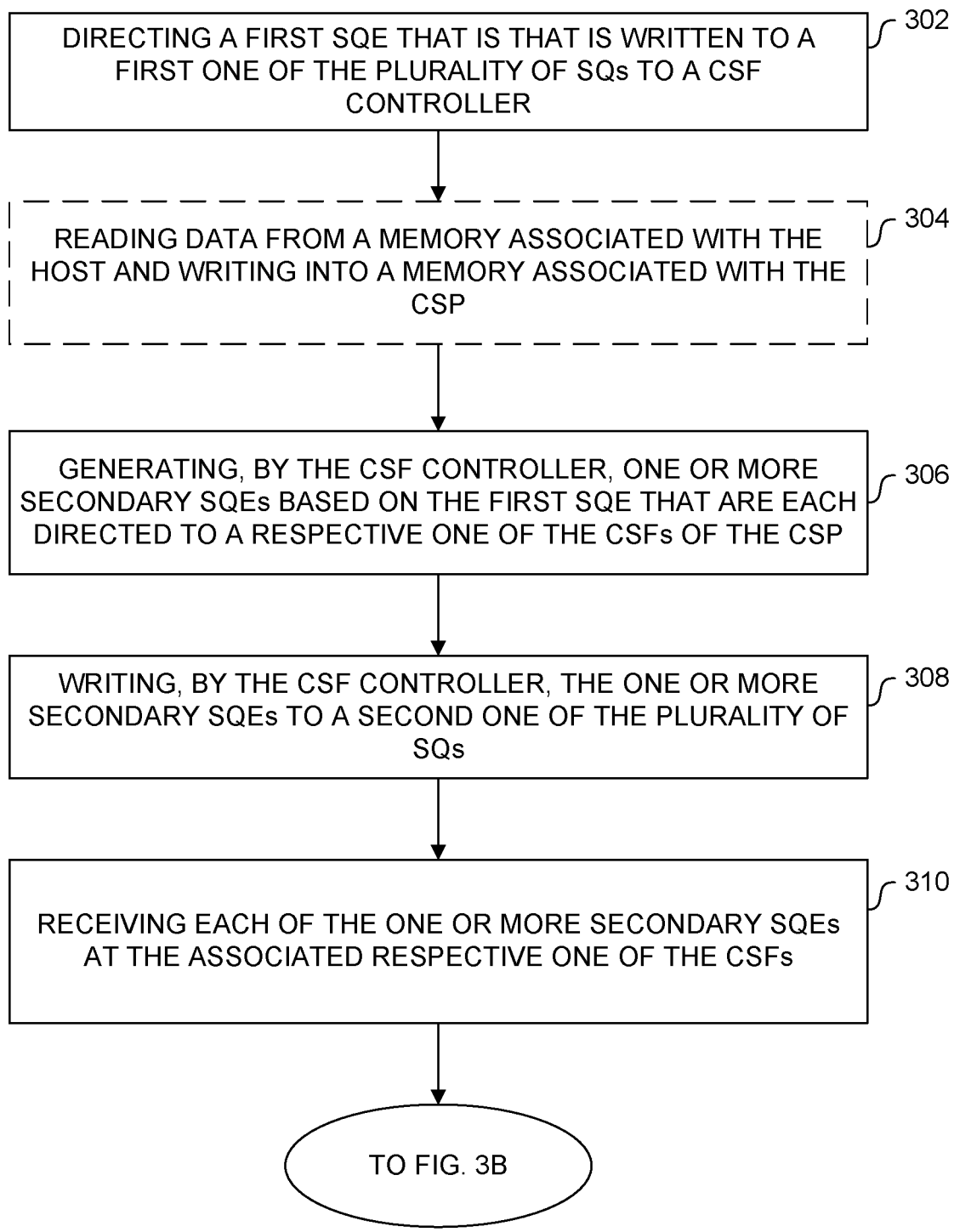
FIGS. 3A and 3B illustrate a method for controlling a computational storage processor according to an embodiment of the present disclosure.
Figure 3B:
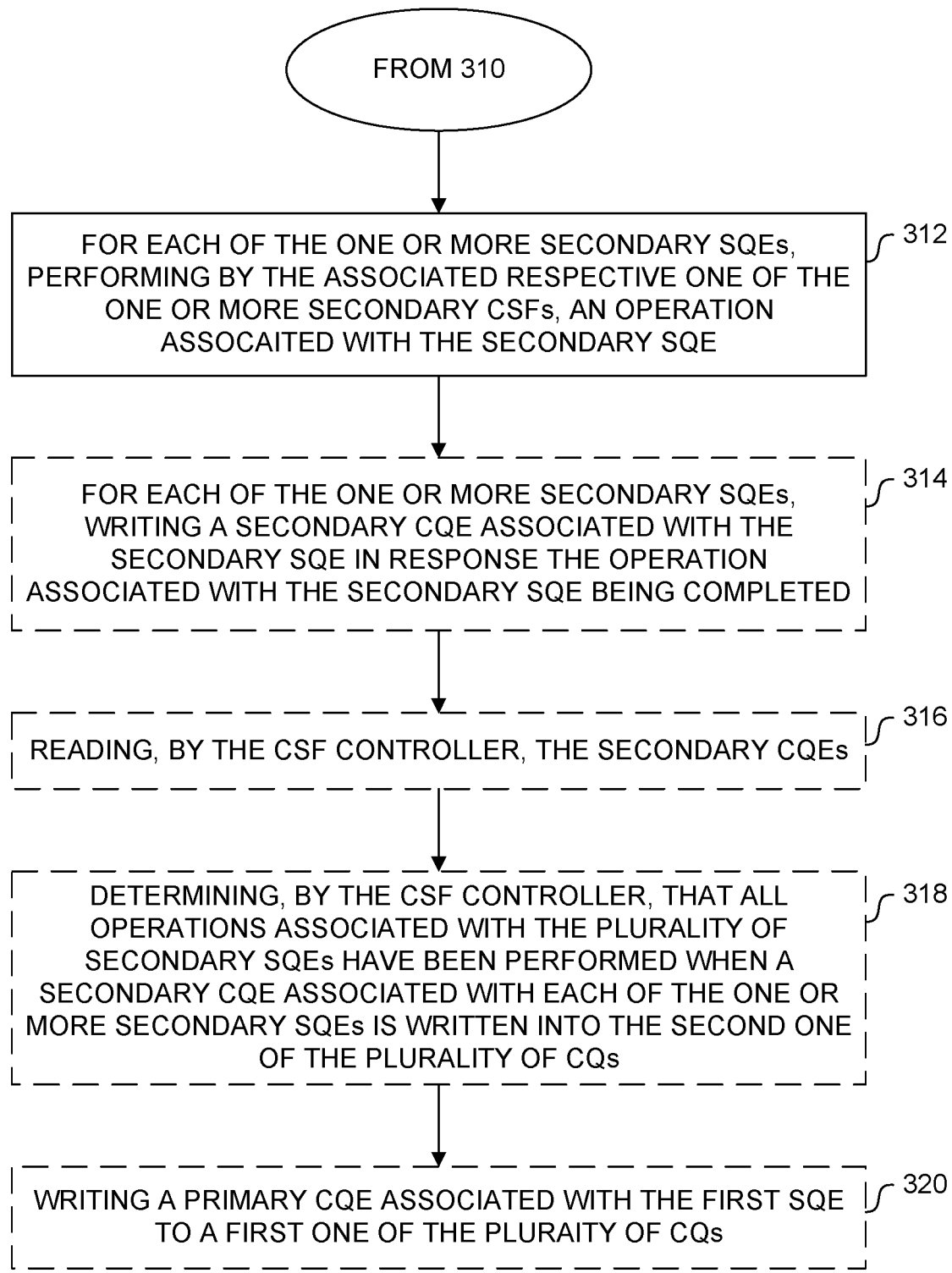

Referring now to FIGS. 3A and 3B, a flow chart illustrating an example method of controlling a CSP that includes a CSF controller, such as CSP 200 that includes CSF controller 216, in accordance with the present disclosure is provided. The method may be performed by one or more processors of a CSP, such as CSP 200, such as, for example, processors included in the CSF controller 216 or the CSP controller 210 or both.

The method illustrated in FIGS. 3A and 3B may be utilized, for example, to schedule multiple operations in a CSP based on a single SQE provided by a host. The multiple operations may relate to, for example, decrypting encrypted compiled code and programming an embedded processor of the CSP utilizing the decrypted compiled code.

Additionally, in the description of the method set out in FIGS. 3A and 3B, references to the CSF controller 206 or to one of the CSFs 212-0 to 212-3 may be understood to refer to the combination of the CSF controller and its associated interface or to a CSF and its associated interface such that some of the actions described as being performed by a CSF controller or a CSF may actually be performed by the associated interface.

Although the below description of the method of FIGS. 3A and 3B is described with reference to the elements of the CSP 200 shown in FIG. 2, the example method illustrated in FIGS. 3A and 3B may be performed by any CSP that includes a CSF controller. Further, the method described below with reference to FIGS. 3A and 3B may include fewer or additional steps than those included in FIGS. 3A and 3B, or may include steps in a different order than the order shown in FIGS. 3A and 3B.

At 302, a first SQE written to a first one of a plurality of SQs 206 of the CSP 200 is directed to a CSF controller 216. The first SQE may be written to the SQs by the host 202. The host 202 may write the first SQE to a first one of the plurality of SQs 206, which is a SQ 206 that is accessible to the host 202. "Accessible to the host" in the context of SQs and CQs of the present disclosure may refer to SQs and CQs that are designated as external SQs and CQs, meaning that the host is aware of these SQs and CQs and accesses these SQs and CQs.

In a CSP 200 that operates utilizing the NVMe standard, directing the first SQE to the CSF controller may be performed by the CSP controller 210 reading the first SQE from the first one of the plurality of SQs 206, then transmitting the first SQE to the CSF controller 216. The SQE may include a namespace identifier of the intended CSF to which it is to be directed. In this case, the first SQE may include a namespace identifier of the CSF controller 216.

However, in other examples, such as when the method is performed by CSPs that do not utilize the NVMe standard, directing the first SQE to the CSF controller may be performed in other ways such as, for example, the CSF controller reading the SQE directly from the first one of the plurality of SQs, or by the host 202 writing the SQEs into internal SQs that are accessible by the CSF controller.

Optionally, at 304, data that is associated with the SQE may be read from a memory associated with the host 202 (not shown in FIG. 2) and written to a memory associated with the CSP 200. For example, the CSP 200 may include onboard memory (not shown in FIG. 2), or offboard memory, on which data to be operated on may be written to. Reading and writing of data at 304 may be performed by, for example, the CSF controller 216, or by the CSF controller IFC 218. In other examples, any of the other elements of the CSP 200, or the host 202, that has access to the memory associated with the CSP 200 may read data from the host accessible memory and write the data to the memory associated with the CSP.

At 306, the CSF controller 216 generates one or more secondary SQEs based on the first SQE. Each of the generated secondary SQEs may relate to an operation to be performed by a particular one of the CSFs 212-0 to 212-3. Each of the secondary SQEs generated at 306 may be directed to the CSF 212-0 to 212-3 that will perform the operation by, for example, including a namespace identifier of that CSF 212-0 to 212-3.

At 308, the one or more secondary SQEs generated at 306 are written by the CSF controller 206 into a second one of the plurality of SQs 206. The second one of the plurality of SQs 206 may be different from the first one of the plurality of SQs 206 that the first SQE was written to. For example, the second one of the SQs 206 may be an internal SQ that is not known to the host 202, and therefore not accessed by the host 202. In this way, internal SQEs, such as the secondary SQEs generated at 306, may be maintained separately from external SQEs written by the host 202, such as the first SQE. Maintaining internal SQs may facilitate, for example, multiple operations involving multiple internal secondary SQEs being performed in response to a single external SQE written by the host 202 in a manner that is transparent to the host 202, freeing up processing resources of the host 202.

At 310, each of the secondary SQEs is received at the associated respective one of the plurality of the CSFs 212-0 to 212-3. In CSPs that utilize the NVMe protocol, such as the example CSP 200 shown in FIG. 2, the secondary SQEs may be received at the associated respective CSFs 212-0 to 212-3 via the CSP controller 210, which reads the secondary SQEs from the second one of the plurality of SQs 206 and directs the secondary SQEs to the appropriate CSFs 212-0 to 212-3.

In other examples, the secondary SQEs may be received by the associated respective CSFs 212-0 to 212-3 other ways such as, for example, the CSFs 212-0 to 212-3 reading the SQEs from the SQs 206 directly, or by the CSF controller 216 directing the secondary SQEs to the appropriate CSFs 212-0 to 212-3 via, for example, writing each of the secondary SQEs to an appropriate internal SQ accessed by the appropriate one of the CSFs 212-0 to 212-3.

At 312, an operation associated with each of the secondary SQEs is performed by the associated respective one of the plurality of CSFs 212-0 to 212-3. In an example in which two or more secondary SQEs are generated at 306, the operations may be performed by separate CSFs 212-0 to 212-3 simultaneously or sequentially, or some operations may be performed simultaneously while other operations are performed sequentially.

For example, in the case in which the secondary SQEs relate to compression and encryption of data, a first secondary SQE may be generated at 306 and written at 308 directed to a first CSF to perform the compression, then, after the compression operation is completed, a second secondary SQE may be generated at 306 and written at 308 directed to a second CSF to encrypt the compressed data generated by the first CSF.

Additional secondary SQEs may be generated at 306 and written at 308 related to data transfers related to operations performed by the CSFs. In some examples, the data generated by one CSF during a first operation may be transmitted directly to a second CSF that performs a second operation, rather than the first CSF writing the generated data to a memory associated with the CSP, then the second CSF reading the data from the memory. Passing data directly between CSFs 212-0 to 212-3 when performing sequential operations may increase speed and efficiency of the CSP by reducing the number of writes and reads to a memory associated with the CSP. In the above example, the first CSF may transmit the compressed data directly to the second CSF for encryption.

The scheduling of sequential operations may be controlled by the CSF controller 206 utilizing, for example, CQEs written to CQs 208 of the CSP 200. The CQEs may be written to internal CQs that are not accessed by the host, similar to the internal SQs described previously. Utilizing CQEs in this way may utilize some or all of the optional steps 314 to 320 shown in FIG. 3B and described below.

Optionally, at 314, for each of the secondary SQEs, a secondary CQE is written to a second one of the CQs 208 of the CSP 200 in response to the operation associated with the secondary SQE being completed. In CSPs that utilize the NVMe protocol, such as the example CSP 200 shown in FIG. 2, the secondary CQEs may be written by the CSP controller 210. The CSP controller 210 may write the secondary CQE in response to receiving an indication from the CSF 212-0 to 212-3 that performed the operation associated with the secondary SQE. The indication may include an indication of whether the operation was performed successfully or not, and the secondary CQE optionally written at 314 may include information regarding whether the operation was successful or not. The secondary CQEs may be directed to the CSF controller 216 by, for example, including a namespace identifier associated with the CSF controller 216.

Optionally, at 316, the CSF controller 216 reads the secondary CQEs from the second one of the plurality of CQs 208. In cases in which sequential operations are scheduled by the CSF controller 216, a secondary SQE associated with a subsequent operation may be generated at 306 and written at 308 only after a secondary CQE associated with the secondary SQE of a previous action that indicates that the previous action was performed successfully is received by the CSF controller 216.

In the example in which sequential compression and encryption is performed, the CSF controller 216 may first generate and write a secondary SQE related to the compression operation at 306 and 308 as described previously. Later, the CSF controller 216 then generates and writes a secondary SQE at 306 and 308 respectively only after the CSF controller 216 reads a secondary CQE at the 316 that indicates that the compression operation was successfully performed.

Optionally, at 318, the CSF controller 216 may determine that all of the operations associated with the plurality of secondary SQEs have been performed when a secondary CQE associated with each of the one or more secondary SQEs is written into the second one of the plurality of CQs 208.

In response to determining at 318 that all of the operations associated with the plurality of SQEs has been performed, at 320 a primary CQE associated with the first SQE is optionally written to a first one of the plurality of CQs 208.

In a CSP 200 that that is configured to utilize the NVMe protocol, the primary CQE may be written, for example, by the CSP controller 210. In this example, the CSF controller 216 may send an indication to the CSP controller 210 in response to the CSP controller 216 determining at 318 that all of the operations associated with the plurality of secondary SQEs have been performed. In response to receiving the indication from the CSF controller 216, the CSP controller 210 writes the primary CQE to the second one of the plurality of CQs 208. The indication sent by the CSF controller 216 may indicate whether the operations were performed successfully, or whether any of the operations were not performed successfully. The indication may indicate which of the operations were successful or which of the operations were not successful, or both. The primary CQE written in response to receiving the indication may include an indication of whether the operation associated with the first SQE was successful or not.

In other examples, the primary CQE may be written at 320 by any other components of the CSP, such as for example the CSF controller.

The primary CQE may be directed to the host 202, and the first one of the plurality of CQs 208 may be for external one of the CQs 208, whereas the second one of the CQs 208 may be for internal use, as described previously.

As set out previously, including a CSF controller within a CSP may facilitate a CSF of one CSP performing an operation in response to a SQE being written by a host of a separate CSP. In this aspect of the present disclosure, a CSF controller of a CSP may be configured to operate as a bridge to another, separate, CSP to facilitate directing a first SQE written to one CSP being directed to the second, separate, CSP. This process may be transparent to the host such that the host need not know which CSP the CSF that performed the desired operation resides on.

In an example, the method illustrated in FIGS. 3A and 3B may be utilized to program an embedded processor of a CSP utilizing encrypted compiled code. The embedded processor may be, for example, one of the CSFs 212-0 to 212-4 of the CSP 200 shown in FIG. 2, or may be a separate embedded processor not shown in FIG. 2 such as, for example an ARM processor or a bytecode interpreter or any other processor that may be programmed. In this example, a first one of the CSFs 212-0 to 212-4 is configured as a decryption engine that performs a decrypt operation. The first SQE directed to the CSP controller 216 at 302 comprises a command to program the compiled code onto the embedded processor. The first SQE may indicate a location of the compiled code, which may be a host accessible memory associated with the host 202 (not shown in FIG. 2).

The CSF controller 216 may first read the encrypted compiled code from the host accessible memory and write the encrypted compiled code into the memory (not shown in FIG. 2) associated with the CSP 200. The memory may be located on the CSP 200 or located off the CSP 200 but accessible by the CSP 200. In the case in which the embedded processor is a bytecode interpreter, the encrypted compiled code is encrypted compiled bytecode.

The CSF controller 416 may then generate at 306 and write at 308 a first secondary SQE directed to the CSFs 212-0 to 212-3 configured as a decryption engine to cause the decryption engine to decrypt the encrypted compiled code stored in the memory associated with the CSP 200 using the decryption key to generate decrypted compiled code. Directing the first secondary SQE to the decryption engine at 310 may include providing additional information that the CSF 212-0 to 212-3 configured as a decryption engine may utilize for decrypting the encrypted compiled code, including the CSP controller 210 providing the decryption key to the CSF 212-0 to 212-3 configured as a decryption engine. In another example, the SQE may include a pointer to information that enables the CSF 212-0 to 212-3 configured as a decryption engine to obtain the decryption key.

The CSF controller 216 also generates at 306 and writes at 308 a second secondary SQE directed to decryption engine to cause the decryption engine to write the decrypted compiled code to the memory associated with the CSP. This second secondary SQE may be combined together with the first secondary SQE such that a single SQE commands the decryption engine to decrypt the code and write the decrypted code to the memory.

The CSF controller 216 also generates at 306 and writes at 308 a third secondary SQE directed to the embedded processor to cause the embedded processor to execute the decrypted compiled code from the memory. The third secondary SQE may only be generated at 306 or written at 308 after the decrypted compiled code has been successfully generated by the decryption engine.

For example, the decryption engine may send an indication to the CSP controller 210 after performing the decryption operation that indicates whether the decryption operation was successful or not. Based on this indication, the CSP controller 210 optionally writes a secondary CQE to a second one of the CQs 208 at 314, the secondary CQE indicating whether the decryption operation was successful based on the indication received from the decryption engine. The secondary CQE is read by the CSF controller 216, which determines whether the decryption operation was successful, and only if the decryption operation is determined to have been successful does the CSF controller 216 generate and write the third secondary SQE. Alternatively, or additionally, the CSF controller 216 may only generate or write, or both generate or write, the third SQE after reading a secondary CQE that the decrypted compiled code is written to the memory associated with the CSP 200.

Figure 4:
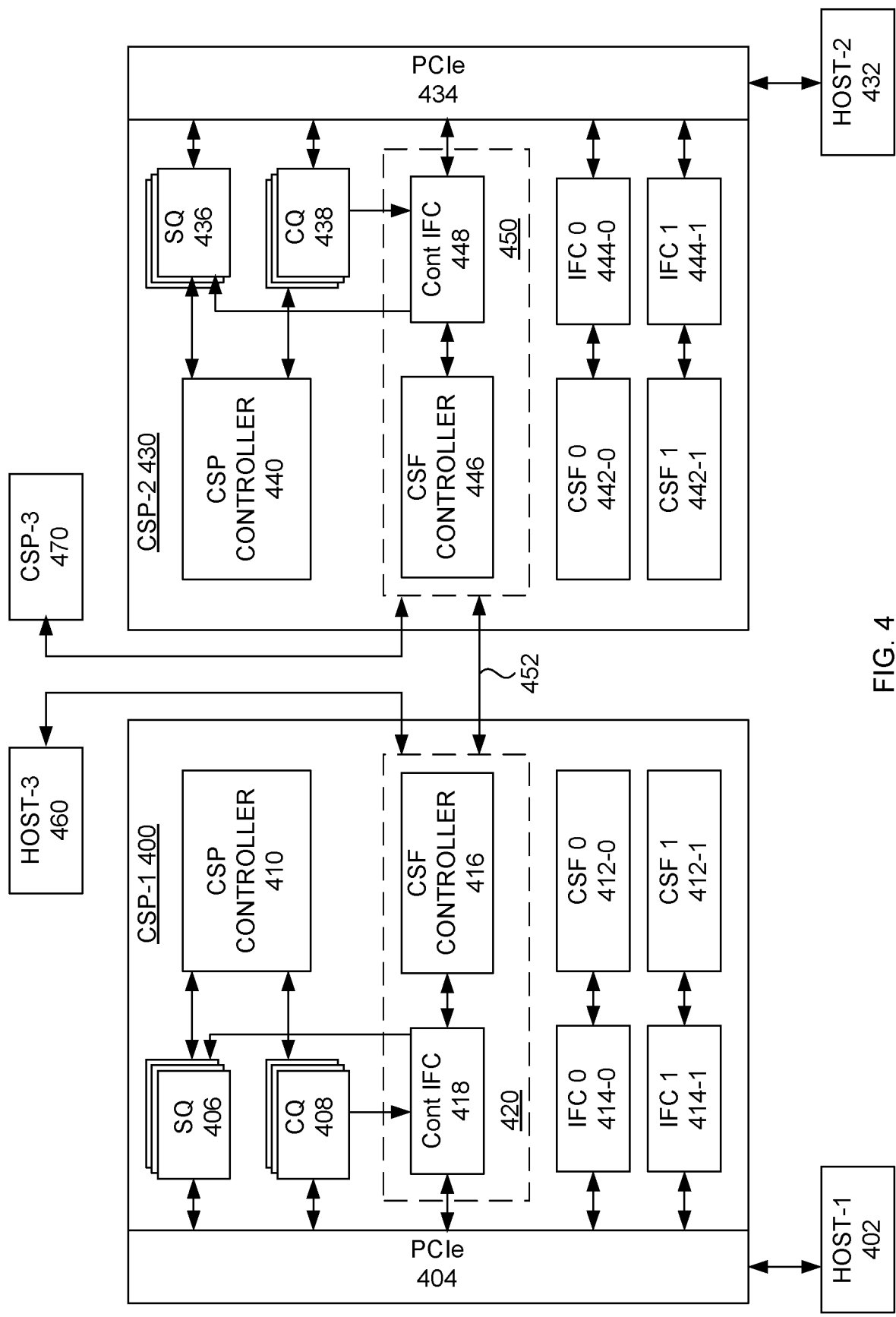
FIG. 4 illustrates a computational storage processor system according to an embodiment of the present disclosure.

FIG. 4 shows an example of a computational storage system comprising a first CSP, CSP-1 400, and a second CSP, CSP-2 430. CSP-1 400 is connected to a host, HOST-1 402 via a PCIe interface 404, and includes a plurality of SQs 406, a plurality of CQs 408, a CSP controller 410, CSFs 412-0 and 412-1, each having an associated interface 414-0 and 414-1, and a CSF controller 416 having an associated controller interface 418. CSP-2 430 is connected to a host, HOST-2 432 via a PCIe interface 434, an includes a plurality of SQs 436, a plurality of CQs 438, a CSP controller 440, CSFs 442-0 and 442-1 each having an associated interface 444-0 and 444-1, and a CSF controller 446 having an associated controller interface 448.

CSP-1 400 and CSP-2 430, including the CSF controller 416 and interface 418 and CSF controller 446 and interface 448, respectively, may each include all of the functionality of the CSP 200 described above with reference to FIGS. 2, including performing the method as described above with reference to FIGS. 3A and 3B, and therefore the elements of the CSP-1 400 and the CSP-2 430 and their functionality is not described here to avoid duplication.

Although the example CSP-1 400 includes two CSFs 412-0 and 412-1, and the example CSP-2 430 includes two CSFs 442-0 and 442-1, each of CSP-1 400 and CSP-2 430 may include any number of CSFs, and in addition to, or alternative to, the on-board CSFs shown in the example CSPs 400 and 430 shown in FIG. 4, either or both of CSP-1 400 and CSP-2 430 may include off-board CSFs, similar to CSFs 212-2 and 212-3 of the CSP 200 shown in FIG. 2.

However, additional to any previously described functionality, the CSF controller 416 and the associated controller interface 418 are configured to form a bridge 420 of CSP-1 400. Similarly, the CSF controller 446 and the associated controller interface 448 are configured to form a bridge 450 of CSP-2 430. The bridges 420 and 450 are connected by connector 452 such that CSP-1 400 may communicate with CSP-2 430 and vice versa. For examples, the bridge 420 and 450 connected by connector 452 facilitates a host of one CSP, such as HOST-1 402 of CSP-1 400, initiating an operation to be performed by a CSF of a second, separate CSP, such as CSP-2 430 by writing a SQE directed to CSF controller 416 of the CSP-1 400.

The connector 452 may be any suitable wired or wireless connection, and may form part of, for example, a dedicated PCIe connection, a local area network (LAN), or wide area network (WAN).

In some examples, additional hosts or additional CSPs, or both, may be connected to the bridge of one or both of the CSP-1 400 and CSP-2 430. In the example shown in FIG. 4, the bridge 420 of CSP-1 400 is connected to a third host, HOST-3 460, and the bridge 450 of CSP-2 430 is connected to a third CSP, CSP-3 470. The bridge 420 may be connected to the HOST-3 460 by any suitable wired or wireless connection, and may form part of, for example, a dedicated PCIe connection, a LAN, or a WAN. Similarly, the bridge 450 may be connected to CSP-3 470 by any suitable wired or wireless connection, and may form part of, for example, a dedicated PCIe connection, a LAN, or a WAN.

Connecting the bridge 420 to HOST-3 460 enables HOST-1 402 and CSP-1 400 to access computational and storage resources available on HOST-3 460. Connecting the bridge 450 of CSP-2 430 to CSP-3 470 enables chaining CSPs together such that, for example, operations performed by CSFs on CSP-3 470 may be accessible by any of the hosts connected to the system.

As noted above, configuring the CSF controllers of two or more CSPs as bridges, and connecting the bridges together, such as the connection 452 between the bridge 420 of CSP-1 400 and the bridge 450 of CSP-2 430 in the example shown in FIG. 4 enables operations to be performed by a CSF of a second CSP, such as CSP-2 430, that have been initiated by a host of a first CSP, such as host 402 connected to CSP-1 400 in way that is transparent to that host, i.e., such that the host 402 need not know the location of the CSF that performs the initiated operation.

Figure 5A:
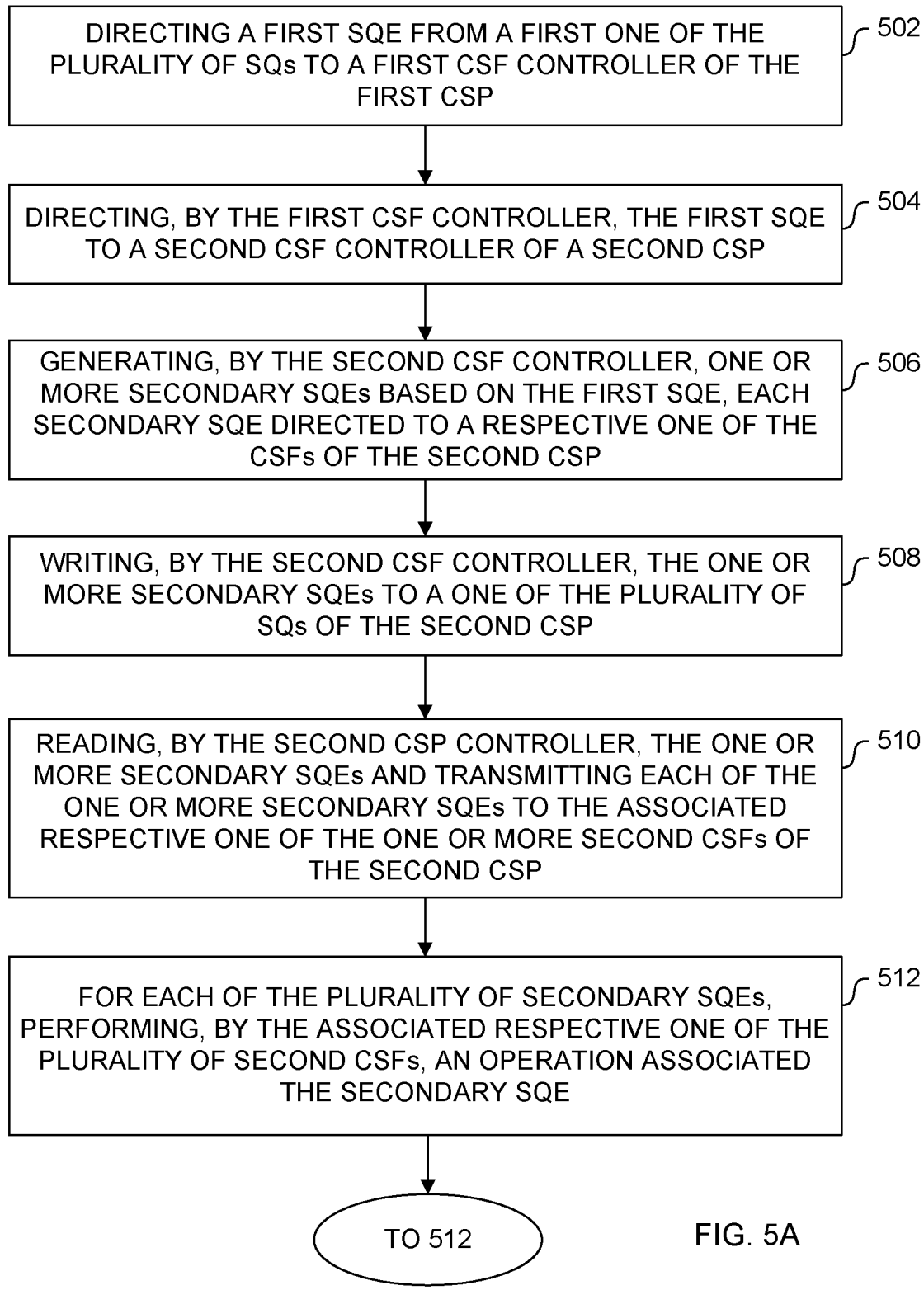
FIGS. 5A and 5B illustrates a method for controlling a computational storage processor according to the present disclosure.
Figure 5B:
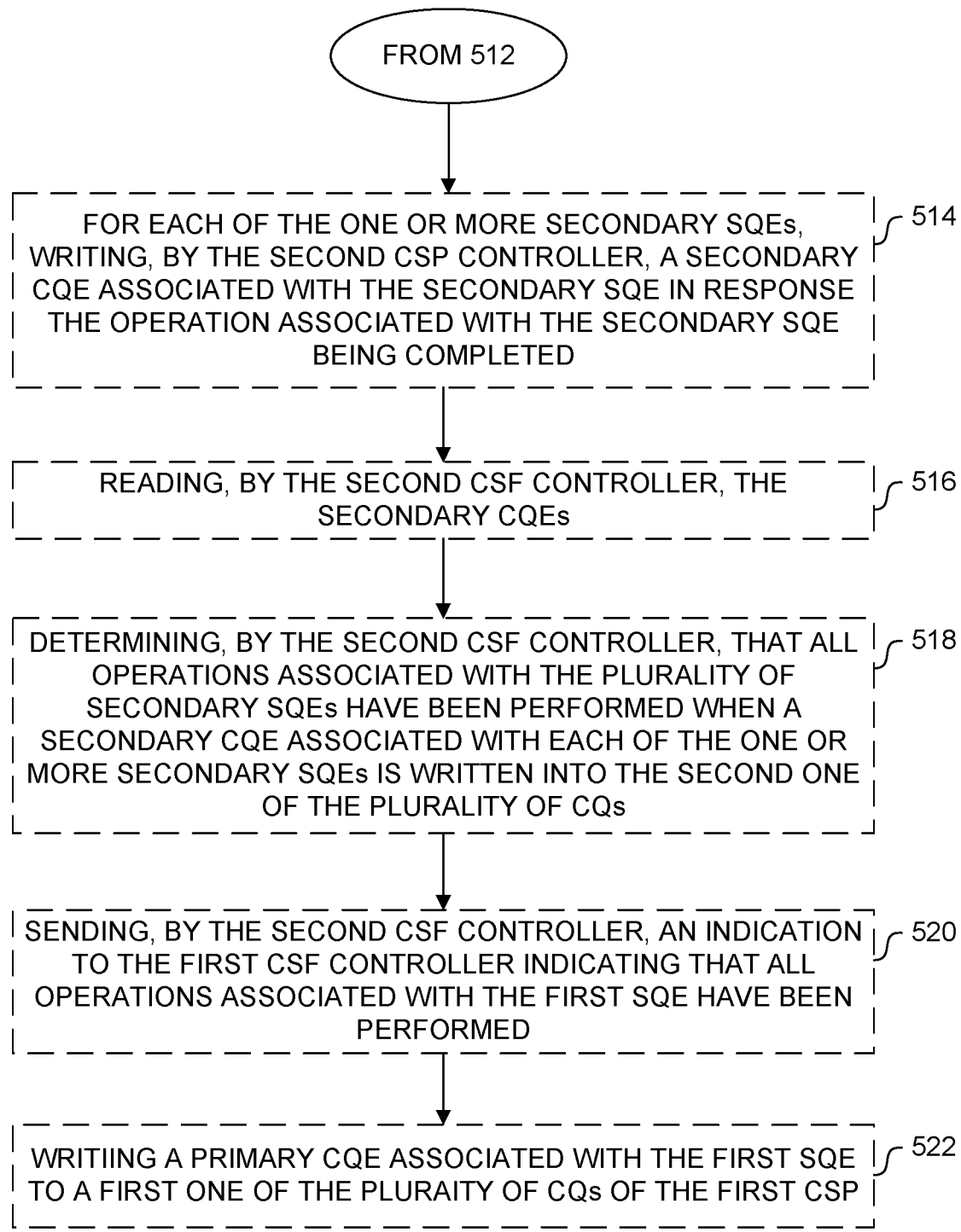

FIGS. 5A and 5B include a flow chart illustrating an example method of controlling a computational storage system having two CSPs that each have a CSF controller, where the CSF controllers are connected together in the form of a bridge as described previously with reference to FIG. 4. The computational storage system that performs the method illustrated in FIGS. 5A and 5B may be similar to the system including the CSPs 400 and 430 shown in FIG. 4.

The example method illustrated in FIGS. 5A and 5B is described with reference to the elements included in the example system shown in FIG. 4 that includes CSP-1 400 and CSP-2 430, however, the method may be performed by a system of two or more CSPs that differ from the example CSPs shown in FIG. 4 and described previously.

Additionally, in the description of the method set out in FIGS. 5A and 5B, references to the CSF controller or to one of the CSFs may be understood to refer to the combination of the CSF controller and its associated interface or to a CSF and its associated interface such that some of the actions described as being performed by a CSF controller or a CSF may actually be performed by the associated interface. Further, the method described below with reference to FIGS. 5A and 5B may include fewer or additional steps than those included in FIGS. 5A and 5B, or may include steps in a different order than the order shown in FIGS. 5A and 5B.

At 502, a first SQE that is written to a first one of a plurality of SQs 406 of the CSP-1 400 is directed to a first CSF controller 416. The first SQE may be written to the SQ 406 by the HOST-1 402. The HOST-1 402 may write the first SQE to a first one of the plurality of SQs 406, which is a SQ 406 that is accessible to the HOST-1 402.

In a CSP-1 400 that operates utilizing the NVMe standard, directing the first SQE to the first CSF controller 416 at 502 may be performed by the first CSP controller 410 reading the first SQE from the first one of the plurality of SQs 406 then transmitting the first SQE to the first CSF controller 416. SQEs may include a namespace identifier of the intended CSF to which it is to be directed. In this case, the first SQE may include a namespace identifier of the first CSF controller 416.

In other examples, such as when the method is performed by CSPs that do not utilize the NVMe standard, directing the first SQE to the first CSF controller 416 may be performed in other ways such as, for example, the first CSF controller 416 reading the SQE directly from the first one of the plurality of SQs 406.

At 504 the first CSF controller 416 directs the first SQE to the second CSF controller 446 of the CSP-2 430. The first CSF controller 416 may direct the first SQE to the second CSF controller 446 in response to, for example, determining that a CSF configured to perform the operation set out in the first SQE resides on the CSP-2 430.

The first CSF controller 416 may be programmed to determine where an appropriate CSF resides to perform an operation associated with the first SQE. The first CSF controller 416 may be hardened or soft programmable to determine where the appropriate CSF resides. The first CSF 416 may be programmed to utilize a look-up table that includes where the different CSF resources are located, similar to a domain name system (DNS) server in an internet protocol (IP) network. The address of the appropriate CSF resource, determining utilizing the lookup table, may be used to find the destination of the CSF and how to route the SQE. In cases in which the determined CSF is one of the CSF 442-0 or 442-1 of the CSP-2 430, the first CSF controller 416 will direct the first SQE to the second CSF controller 446 at 504.

The first CSF controller 416 may be programmed to determine where an appropriate CSF resides statically or dynamically. For example, in a static determination, the first CSF controller 416 may be programmed to explicitly direct SQEs in a predetermined manner based on the first SQE that is received. In this example, the first CSF controller 416 is rarely reprogrammed and the configuration programmed into the first CSF controller 416 is used many times, but it will gain some performance improvements since the first CSF controller 416 may be optimized to use this workflow. In another example in which a dynamic determination of an appropriate CSF, the SQE may include a configuration header that describes the operations to perform and, using a look up table, such as a routing table, the first CSF controller 416 directs appropriate blocks of the SQE to appropriate CSPs in the order defined in the configuration header.

The first SQE is directed to the second CSF controller 446 via the connector 452 between the first bridge 420 and second bridge 450.

At 506, the second CSF controller 446 generates one or more secondary SQEs based on the first SQE. Each of the generated secondary SQEs may relate to an operation to be performed by a particular one of the CSFs 442-0 or 442-1 of the CSP-2. Each of the secondary SQEs generated at 506 may be directed to the CSF 442-0 or 442-1 that will perform the operation. Each of the secondary SQEs may be directed to the appropriate CSF 442-0 or 442-1 by including a namespace identifier of that CSF 442-0 or 442-1.

At 508, the one or more secondary SQEs are written by the second CSF controller 446 into one of the plurality of SQs 436 of the CSP-2 430. The one of the plurality of SQs 436 may be, for example, an internal SQ that is not known to the HOST-2 432 that is associated with the CSP-2. In this way, internal SQEs may be maintained separately from external SQEs written to by the HOST-2 432 such that, for example, operations performed by the CSFs 442-0 or 442-1 of the CSP-2 may be initiated by a remote host, such as the HOST-1 402 in a manner that is transparent to the HOST-2 432, freeing up processing resources of the HOST-2 432.

The generating one or more secondary SQEs at 506 and writing the one or more secondary SQEs at 508 may be performed substantially similar to the generating and writing secondary SQEs at 306 and 308, respectively, as described previously, and therefore the details of the generating and writing at 506 and 508 are not described in detail here to avoid unnecessary repetition.

At 510, each of the secondary SQEs is received at the associated respective one of the plurality of the CSFs 442-0 to 442-1 of the CSP-2 430.

In CSPs that utilize the NVMe protocol, such as the example CSP-2 430 included in the computational storage system described previously with reference to in FIG. 4, the secondary SQEs may be received at the associated respective CSFs 442-0 to 442-1 by the second CSP controller 440 reading the secondary SQEs from the one of the plurality of SQs 436 and directing the secondary SQEs to the appropriate CSFs 442-0 or 442-1.

In other examples, the secondary SQEs may be received by the associated respective CSFs 442-0 to 442-1 other ways such as, for example, the CSFs 442-0 to 442-1 reading the secondary SQEs from the SQs 436 directly, or the second CSF controller 446 directing the one or more secondary SQEs to the appropriate CSF 442-0 and 442-1.

At 512, an operation associated with each of the secondary SQEs is performed by the associated respective one of the plurality of CSFs 442-0 to 442-1. In the case in which two or more secondary SQEs are generated at 506, the operations may be performed simultaneously or sequentially, or some operations may be performed simultaneously while other operations are performed sequentially, similar to the performance of operations described previously with reference to 312 of the method described with reference to FIGS. 3A and 3B.

In some examples, the data generated by one of the CSFs 442-0 to 442-1 during a first operation may be transmitted directly to a second one of the CSFs 442-0 to 442-1 that performs a second operation, rather than the first CSF writing the generated data to, for example, a memory of the CSP-2 430 (not shown in FIG. 4), then the second one of the CSFs 442-0 to 442-1 reading the data from the memory. Passing data directly between CSFs 442-0 to 442-1 when performing sequential operations may increase speed and efficiency of the CSP-2 430 by reducing the number of writes and reads to a memory associated with the CSP-2 430. Controlling data flows in this way may be performed utilizing additional secondary SQEs generated at 506 and written at 508 similar to controlling data flow described previously with reference to 306 and 308 of the method shown in FIGS. 3A and 3B.

The scheduling of sequential operations may be controlled by the second CSF controller 446 utilizing, for example, CQEs written to CQs 438 of the CSP-2 430. The CQEs may be written to internal CQs 438 that are not accessed by the HOST-2 432 of the CSP-2 430. Utilizing CQEs in this way may utilize some or all of the optional steps 514 to 522 described below.

Optionally, at 514, for each of the secondary SQEs, a secondary CQE is written to one of the CQs 438 of the CSP-2 430 in response to the operation associated with the secondary SQE being completed. In CSPs that utilize the NVMe protocol, such as the example CSPs 400, 430 described with reference to FIG. 4, the secondary CQEs may be written by the second CSP controller 440. The second CSP controller 440 may write the secondary CQE in response to receiving an indication from the CSF 442-0 to 442-1 that performs the operation associated with the secondary SQE. The indication may include information regarding whether or not the operation was performed successfully. The secondary CQE may be directed to the second CSF controller 446 by, for example, writing the secondary CQE to a CQ 438 that is dedicated to the CSF controller 446.

Optionally, at 516, the second CSF controller 446 reads the secondary CQEs from the one of the plurality of CQs 438. In cases in which sequential operations are scheduled by the second CSF controller 446, a secondary SQE associated with a subsequent operation may be generated at 506 and written at 508 only after a secondary CQE associated with the secondary SQE of a previous action that indicates that the previous action was performed successfully is received by the second CSF controller 446.

Optionally, at 518, the second CSF controller 446 may determine that all of the operations associated with the plurality of secondary SQEs have been performed when a secondary CQE associated with each of the one or more secondary SQEs is written into the one of the plurality of CQs 448.

In response to determining at 518 that all of the operations associated with the plurality of SQEs has been performed, the second CSF controller 446 optionally sends an indication to the first CSF controller 416 indicating that all operations associated with the first SQE have been performed at 520. The indication sent by the second CSF controller 446 at 520 may indicate whether the operations were performed successfully, or whether any of the operations were not performed successfully. For example, the indication may indicate which of the operations were successful or which of the operations were not successful, or both.

In response to receiving the optional indication at 520, a primary CQE associated with the first SQE may be written to a first one of the plurality of CQs 408 of the CSP-1 400. In examples in which the CSP-1 400 is configured to utilize the NVMe protocol, the primary CQE may be written, for example, by the first CSF controller 410. In this example, the first CSF controller 416 may send an indication to the first CSP controller 410 in response to the first CSF controller 416 receiving the indication from the second CSF controller 446 that all of the operations associated with the plurality of secondary SQEs have been performed. For example, the first CSF controller 416 may direct the indication received from the second CSF controller 446 to the first CSP controller 410. In response to receiving the indication from the first CSF controller 416, the first CSP controller 410 writes the primary CQE to the first one of the plurality of CQs 408. The indication sent by the first CSF controller 416 may indicate whether the operations were performed successfully, or whether any of the operations were not performed successfully. For example, the indication may indicate which of the operations were successful or which of the operations were not successful, or both. The primary CQE written in response to receiving the indication may include an indication of whether the operation associated with the first SQE was successful or not.

In other examples, the primary CQE may be written to the CQs 408 by some other element of the CSP-1 400, such as the first CSF controller 416.

The primary CQE may be directed to the HOST-1 402, and the first one of the plurality of CQs 408 may be an external CQ 408 that is accessed by the HOST-1 402 as described previously.

Embodiments of the present disclosure provide a CSP having one or more CSFs and a CSF controller that is configured to control operations performed by the CSFs. In some embodiments, the CSF controller is configured to dynamically chain together one or more functions performed by the CSFs such that, for example, functions may be performed by more than one CSF utilizing a single command to the CSP. In other embodiments, the CSF controller may function as a bridge between a first CSP which includes the CSF controller and a second CSP having its own CSF controller such that CSFs on the second CSP may be accessed by a host of the first CSP. In these embodiments, the host of the first CSP need not know which CSP the CSF for performing the desired function is located on. The host merely provides the command to the CSF controller of the first CSP, and that CSF controller passes the command to the CSF controller of the second CSP such that the function is performed by one or more of the CSFs of the second CSP.

By controlling the operations performed by the CSFs of a CSP according to the present disclosure, the task of controlling operation is offloaded from the host processor, freeing up resources of host processor. Further, by controlling data transfers between sequential operations, the amount of network traffic may be reduced compared to conventional CSPs. Further, configuring the CSF controllers of the present disclosure to act as bridges between separate CSPs, a host may access additional CSFs residing on separate CSPs to perform data operations, which may result in increased efficiency compared to conventional CSP systems.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method of controlling a computational storage processor (CSP) connected to a host, the CSP comprising a plurality of submission queues (SQs), a plurality of computational storage functions (CSFs), a CSF controller, and a CSP controller, the method comprising:
   receiving at a first one of the plurality of SQs, a first submission queue entry (SQE) directed to the CSF controller;
   directing the first SQE to the CSF controller;
   determining, by the CSF controller, for each of one or more operations associated with the first SQE, a CSF of the plurality of CSFs configured to perform that operation;
   generating, by the CSF controller, one or more secondary SQEs based on the first SQE, wherein the one or more secondary SQEs are not included in the first SQE and each of the one or more secondary SQEs relates to one of the one or more operations associated with the first SQE and is directed to the determined one of the CSFs configured to perform that operation;

writing, by the CSF controller, the one or more secondary SQEs to a second one of the plurality of SQs;

directing each of the one or more secondary SQEs to the associated one of the CSFs that the secondary SQE is directed to; and for each of the one or more secondary SQEs, performing, by the associated one of the CSFs, the operation associated with the secondary SQE.

2. The method according to claim 1, wherein the first one of the plurality of SQs is a SQ that is accessed by the host connected to the CSP, and the second one of the plurality of SQ is a SQ that is not accessed by the host of the CSP.

3. The method according to claim 1, wherein the CSP includes a plurality of completion queues (CQs), the method further comprising:

for each of the one or more secondary SQEs:
in response to receiving an indication from the associated one of the CSFs that the operation associated with the secondary SQE has been completed, writing to a second one of the plurality of CQ a secondary completion queue entry (CQE) associated with the secondary SQE to, the secondary CQE being directed to the CSF controller;
reading, by the CSF controller from the second one of the plurality of CQ, the secondary CQE;
determining, by the CSF controller, that all operations associated with the one or more secondary SQEs have been performed when a secondary CQE associated with each of the one or more secondary SQEs is written into the second one of the plurality of CQ; and
in response to determining, by the CSF controller, that all operations associated with the one or more secondary SQE have been performed, writing a primary CQE directed to the host to a first one of the plurality of CQs.

4. The method according to claim 3, wherein the first one of the plurality of CQs is a CQ that is accessed by the host connected to the CSP, and the second one of the plurality of CQ is a CQ that is not accessed by the host of the CSP.

5. The method according to claim 3, wherein the one or more secondary SQEs generated by the CSF controller comprise a first secondary SQE associated with a first operation and a second secondary SQE associated with a second operation to be performed sequentially after the first operation is performed; and wherein writing, by the CSF controller, the one or more secondary SQEs to a second one of the plurality of SQs comprises writing the second secondary SQE to the second one of the plurality of SQs only after a first secondary CQE associated with the first SQE is read by the CSF controller.

6. The method according to claim 1, wherein:
the CSP includes an embedded processor and a memory, and wherein a first one of the plurality of CSFs is configured to perform decryption; and
the first SQE comprises a command to program compiled code onto the embedded processor;
the method further comprising:
the CSF controller reading encrypted compiled code from a host accessible memory located off the CSP and writing the encrypted compiled code into the memory of the CSP in response to the first SQE being directed to the CSF controller;
wherein:
generating, by the CSF controller, the one or more of secondary SQEs based on the first SQE comprises generating a first secondary SQE directed to the first one of the CSFs to cause the first one of the CSFs to decrypt the encrypted compiled code in the memory using the decryption key to generate decrypted compiled code, a second secondary SQE directed to the first one of the CSFs to cause the first one of the CSFs to write the decrypted compiled code to the memory, and a third secondary SQE directed to the embedded processor to cause the embedded processor to execute the decrypted compiled code from the memory, writing, by the CSF controller, the one or more secondary SQEs to the second one of the plurality of SQs comprising writing the first, second, and third secondary SQEs to the second one of the plurality of SQs; and directing the first secondary SQE to the first one of the CSFs includes providing a decryption key to the first one of the secondary CSF configured to perform decryption.

7. The method according to claim 6, wherein:
writing, by the CSF controller, the second secondary SQE to the second one of the plurality of SQs is performed after the decrypted compiled code is generated by the first one of the CSFs; and
writing, by the CSF controller, the third secondary SQE to the second one of the plurality of SQs is performed after the decrypted compiled code is written to the memory.

8. The method according to claim 6, further comprising determining by the first one of plurality of CSFs whether the decryption operation was successful, and
wherein writing the third secondary SQE is performed by the CSF controller only if the decryption operation was determined to be successfully performed.

9. A method of controlling a computational storage system, the computational storage system including a first computational storage processor (CSP) connected to a first host and a second CSP that is remote to the first CSP, the first CSP comprising a plurality of first submission queues (SQs), a plurality of first computational storage functions (CSFs), a first CSF controller, and a first CSP controller, and the second CSP comprising a plurality of second SQs, a plurality of second CSFs, a second CSF controller and a second CSP controller, wherein the first CSF controller is connected to the second CSF controller via a network, the method comprising:

receiving at one of the plurality of the first SQs of the first CSP, a first submission queue entry (SQE) written by the first host and directed to the first CSF controller;

directing the first SQE to the first CSF controller;

determining, by the first CSF controller, that one of the second CSFs included on the second CSP is configured to perform an operation associated with the first SQE;

directing, by the first CSF controller, the first SQE to the second CSF controller included on the second CSP;

determining, by the secondary CSF controller, for each of one or more operations associated with the first SQE, a CSF of the plurality of second CSFs configured to perform that operation;

generating, by the second CSF controller, one or more secondary SQEs based on the first SQE, wherein each of the one or more secondary SQEs relates to one of the one or more operations associated with the first SQE and is directed to the determined one of the plurality of second CSFs configured to perform that operation;

writing, by the second CSF controller, the one or more secondary SQEs to one of the plurality of second SQs;

directing each of the one or more secondary SQEs to the associated one of the plurality of second CSFs that the secondary SQE is directed to;

for each of the one or more secondary SQEs, performing, by the associated one of the plurality of second CSFs, an operation associated the secondary SQE.

10. The method according to claim 9, wherein the first CSP includes a plurality of first completion queues (CQs) and the second CSP includes a plurality of second CQs, the method further comprising:

for each of the one or more secondary SQEs:
  in response to receiving an indication from the associated one of the plurality of second CSFs that the operation associated with the secondary SQE has been completed, writing, to one of the plurality of second CQs, a secondary completion queue entry (CQE) associated with the secondary SQE, the secondary CQE being directed to the second CSF controller;
  reading, by the second CSF controller from the one of the plurality of second CQs, the secondary CQE;
  determining, by the second CSF controller, that all operations associated with the plurality of secondary SQEs have been performed when a secondary CQE associated with each of the one or more secondary SQEs is written into the plurality of second CQs;
  in response to determining, by the second CSF controller, that all operations associated with the one or more secondary SQE have been performed, sending, by the second CSF controller, an indication to the first CSF controller that all operations associated with the first SQE have been performed;
  in response to receiving the indication from the second CSF controller, writing to one of the plurality of first CQs a primary CQE associated with the first SQE, the primary CQE directed to the first host.

11. A computational storage processor (CSP) connected to a host, the CSP comprising:
  a plurality of submission queues (SQs);
  a plurality of computational storage functions (CSFs);
  a CSF controller; and
  a CSP controller;
  wherein the CSP controller is configured to direct to the CSF controller a first submission queue entry (SQE) that is written to a first one of the plurality of SQs and is directed to the CSF controller;
  wherein the CSF controller is configured to:
    determine, for each of one or more operations associated with the first SQE, a CSF of the plurality of CSFs configured to perform that operation;
    generate one or more secondary SQEs based on the first SQE, wherein the one or more secondary SQEs are not included in the first SQE and each of the one or more secondary SQEs relates to one of the one or more operations associated with the first SQE and is directed the determined one of the CSFs; and
    write the one or more secondary SQEs to a second one of the plurality of SQs; and
  wherein the CSP controller is further configured to direct each of the one or more secondary SQEs to the associated one of the CSFs that the secondary SQE is directed to such that, for each one the one or more secondary SQEs, the associated one of the CSFs performs the operation associated the secondary SQE.

12. The CSP according to claim 11, wherein the first one of the plurality of SQs is a SQ that is accessed by the host connected to the CSP, and the second one of the plurality of SQ is a SQ that is not accessed by the host of the CSP.

13. The CSP according to claim 11, wherein the CSP further comprises a plurality of completion queues (CQs);
  wherein the CSP controller is further configured to, for each of the one or more secondary SQEs:
    in response to receiving an indication from the associated one of the CSFs that the operation associated with the secondary SQE has been completed, write to a second one of the plurality of CQ a secondary completion queue entry (CQE) associated with the secondary SQE to, the secondary CQE being directed to the CSF controller;
  wherein the CSF controller is configured to:
    read from the second one of the plurality of CQ, each of the one or more secondary CQEs; and
    determine that all operations associated with the one or more secondary SQEs have been performed when a secondary CQE associated with each of the one or more secondary SQEs is written into the second one of the plurality of CQ; and
  wherein the CSP controller if further configured to, in response to determining that all operations associated with the one or more secondary SQE have been performed, write a primary CQE directed to the host to a first one of the plurality of CQs.

14. The CSP according to claim 13, wherein the first one of the plurality of CQs is a CQ that is accessed by the host connected to the CSP, and the second one of the plurality of CQs is a CQ that is not accessed by the host of the CSP.

15. The CSP according to claim 13, wherein the CSF controller being configured to generate one or more secondary SQEs comprises the CSF controller being configured to generate a first secondary SQE associated with a first operation and a second secondary SQE associated with a second operation to be performed sequentially after the first operation is performed; and
  wherein the CSF controller being configured to write the one or more secondary SQEs to a second one of the plurality of SQs comprises the CSF controller being configured to write the second secondary SQE to the second one of the plurality of SQs only after a first secondary CQE associated with the first SQE is read by the CSF controller.

16. The CSP according to claim 11, further comprising an embedded processor and a memory, and wherein a first one of the plurality of CSFs is configured to perform decryption and the first SQE comprises a command to program compiled code onto the embedded processor;
  wherein the CSF controller is further configured to read encrypted compiled code from a host accessible memory located off the CSP and writing the encrypted compiled code into the memory of the CSP in response to the first SQE being directed to the CSF controller;
  wherein the CSF controller being configured to generate the one or more of secondary SQEs based on the first SQE comprises the CSF controller being configured to generate a first secondary SQE directed to the first one of the CSFs to cause the first one of the CSFs to decrypt the encrypted compiled code in the memory using the decryption key to generate decrypted compiled code, a second secondary SQE directed to the first one of the CSFs to cause the first one of the CSFs to write the decrypted compiled code to the memory, and a third secondary SQE directed to the embedded processor to cause the embedded processor to execute the decrypted compiled code from the memory;

wherein the CSF controller being configured to write the one or more secondary SQEs to the second one of the plurality of SQs comprises the CSF controller being configured to write the first, second, and third secondary SQEs to the second one of the plurality of SQs; and wherein the CSP controller being configured to direct the first secondary SQE to the first one of the CSFs comprises the CSP controller providing a decryption key to the first one of the secondary CSF configured to perform decryption.

17. The CSP of claim 16, wherein:

the CSF controller is configured to write the second secondary SQE to the second one of the plurality of SQs after the decrypted compiled code is generated by the first one of the CSFs; and the CSF controller is configured to write the third secondary SQE to the second one of the plurality of SQs after the decrypted compiled code is written to the memory.

18. The CSF according to claim 16, wherein:

the first one of plurality of CSFs is configured to determine whether the decryption operation was successful; and the CSF controller is configured to write the third secondary SQE only if the decryption operation was determined to be successfully performed.

19. A computational storage system comprising:

a first computational storage processor (CSP) connected to a first host, the first CSP comprising:
   a plurality of first submission queues (SQs);
   a plurality of first computational storage functions (CSFs);
   a first CSF controller; and
   a first CSP controller; and a second CSP that is remote to the first CSP, the second CSP comprising:
   a plurality of second SQs;
   a plurality of second CSFs;
   a second CSF controller; and
   a second CSP controller, wherein the first CSF controller is connected to the second CSF controller via a network;

wherein the first CSP controller is configured to direct to the first CSF controller a first submission queue entry (SQE) written by the first host to one of the plurality of first SQs and is directed to the first CSF controller;

wherein the first CSF controller is configured to:
   determine that one of the second CSFs included on the second CSP is configured to perform an operation associated with the first SQE; and
   direct the first SQE to the second CSF controller included on the second CSP;

wherein the second CSF controller is configured to:
   determine, for each of one or more operations associated with the first SQE, a CSF of the plurality of second CSFs configured to perform that operation;
   generate one or more secondary SQEs based on the first SQE, wherein each of the one or more secondary SQEs relates to one of the one or more operations associated with the first SQE and is directed to the determined one of the plurality of second CSFs configured to perform that operation; and
   write the one or more secondary SQEs to one of the plurality of second SQs;

wherein the second CSP controller is configured to direct each of the one or more secondary SQEs to the associated one of the plurality of second CSFs that the secondary SQE is directed to such that, for each of the one or more secondary SQEs, the associated one of the plurality of second CSFs perform the operation associated the secondary SQE.

20. The computational storage system according to claim 19, wherein the first CSP further comprises a plurality of first completion queues (CQs) and the second CSP further comprises a plurality of second CQs, wherein:

the second CSP controller is configured to, for each of the one or more secondary SQEs:
   in response to receiving an indication from the associated one of the plurality of second CSFs that the operation associated with the secondary SQE has been completed, write, to one of the plurality of second CQs, a secondary completion queue entry (CQE) associated with the secondary SQE, the secondary CQE being directed to the second CSF controller;

the second CSF controller is configured to:
   read from the one of the plurality of second CQs, the secondary CQE;
   determine that all operations associated with the plurality of secondary SQEs have been performed when a secondary CQE associated with each of the one or more secondary SQEs is written into the plurality of second CQs; and
   in response to determining, by the second CSF controller, that all operations associated with the one or more secondary SQE have been performed, send an indication to the first CSF controller that all operations associated with the first SQE have been performed; and the first CSP controller is configured to, in response to the first CSF controller receiving the indication from the second CSF controller, write a primary CQE associated with the first SQE to one of the plurality of first CQs, the primary CQE directed to the first host.

* * * * *